M. R. HUTCHISON.
SPEED DEVICE AND INDICATOR.
APPLICATION FILED NOV. 8, 1909. RENEWED MAR. 1, 1913.
1,068,136.
Patented July 22, 1913.
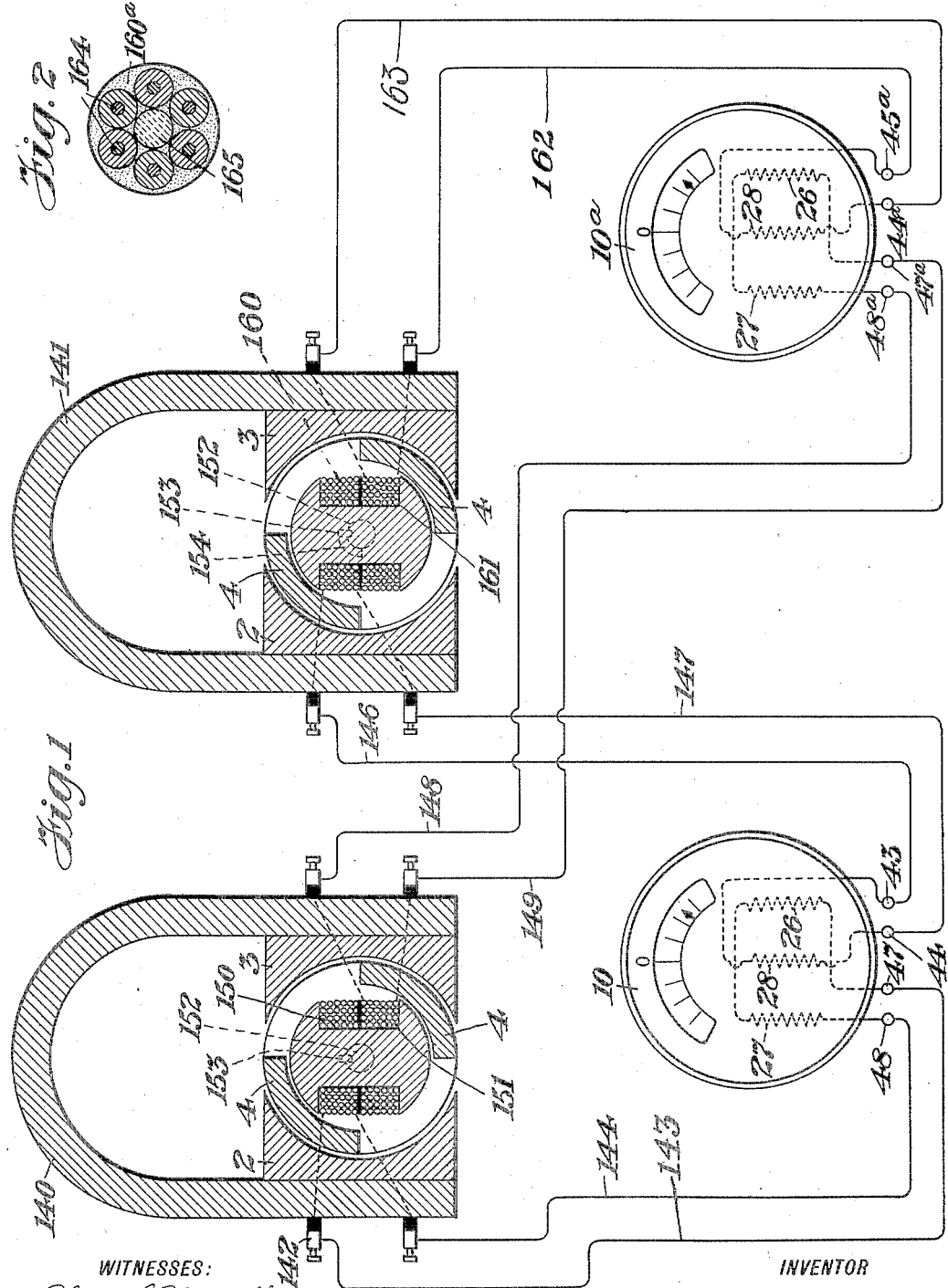

UNITED STATES PATENT OFFICE.

MILLER REESE HUTCHISON, OF SUMMIT, NEW JERSEY, ASSIGNOR TO THE INDUSTRIAL INSTRUMENT COMPANY, OF WATERBURY, CONNECTICUT, A CORPORATION OF CONNECTICUT.

SPEED DEVICE AND INDICATOR.

1,068,136.  Specification of Letters Patent.  Patented July 22, 1913.

Original application filed August 24, 1908, Serial No. 450,059. Divided and this application filed November 8, 1909, Serial No. 526,852. Renewed March 1, 1913. Serial No. 751,649.

*To all whom it may concern:*

Be it known that I, MILLER REESE HUTCHISON, a citizen of the United States, and a resident of Summit, in the county of Union and the State of New Jersey, have invented certain new and useful Improvements in Speed Devices and Indicators, of which the following is a specification.

My present application is a division of my application No. 450,059, filed August 24, 1908, wherein the various features of my invention are set forth at length.

My present invention relates to devices of the above type intended for use on reversible shafts, especially where the work performed when the shaft is rotated in one direction is different in kind or degree from the work done when the shaft is reversed, or where the work done by rotation in one direction tends to undo the work done by rotation in the other direction. A propeller shaft which normally drives the vessel forward but which tends to stop the vessel when reversed is a notable instance of such use.

It is characteristic of my speed indicator that the movement of the shaft is utilized to generate alternating pressures or currents which are used to produce the indications. Such alternating pressures or currents ordinarily have no directional characteristic whereby currents generated by rotation in one direction may be distinguished from those generated by rotation in the other direction, and equal speeds of the reversible shaft in either direction would produce equal indications upon a voltmeter or voltage operating device. Such being the case, an observer looking at the indicator would be informed upon the absence of any indication, or a zero indication being given, that the operation of the shaft had ceased, but upon movement of the indicating means resulting from rotation of the shaft the observer would not be informed of the direction of the rotation, whereas by my invention an observer will be informed of the direction of rotation as well as of the speed of the shaft. To accomplish this result I may use two generators mounted upon the same shaft and connected respectively to the field coils and movable coil of the voltmeter. The angular relation of these generators is such that when the shaft moves in one direction the field coils and movable coil are energized in the same phase, but when the propeller shaft is reversed, one of the generators is arranged to slip circumferentially through an angle of 90 degrees, thereby changing its phase 180 degrees from that of the other generator, thus reversing the effect of the field coils on the movable coil. By this arrangement the indicator is deflected in one direction for speeds of one direction, and in the reverse direction for opposite speeds.

The invention of my present application has for its object the provision of certain improvements whereby in the use of an electrical pressure or voltage to produce an indication, I am enabled to have as many indicating stations as desired. If desired, a circuit may be extended to fifteen or twenty stations and indicating instruments for all the stations may be arranged in parallel circuits or branches. If, by reason of the number or character of instruments the voltage of the generator is modified at the instrument, each instrument of the equipment may be calibrated after installation in accordance with the observed rates of speed or work.

The above described principles of my invention and the manner in which they may be embodied in speed indicators will be more fully understood from a detailed description thereof, in connection with the accompanying drawing in which like characters of reference denoting like parts are applied as in the corresponding figures of the drawings of said application No. 450,059.

Figure 1 is a vertical cross section through a pair of generators, together with a diagram of the circuit connections illustrating my present invention. Fig. 2 is a cross section showing a modified arrangement for the plurality of armature windings.

In Fig. 1 I have shown a multiple circuit arrangement operating to indicate speeds forward and speeds on the reverse by means of independently generated alternating currents operating in phase in one direction and out of phase in the other; and since in installations where rough usage is liable to be met with, as for instance, in the case of a multiple station speed indicator on a battle ship, it is desirable that open circuiting or short circuiting of one of the instruments should not seriously affect the readings of the other. I have shown a form of multiple station designed to minimize the effect of an open or short circuiting of one of the instruments. In such case a separate circuit may be used for each indicator, each circuit being independently connected with a separate winding for the armatures. By making each armature winding of very high internal resistance the effect of short circuiting or open circuiting one of them will be decreased. In said Fig. 1, two magnetos 140, 141 are employed to generate alternating voltages and currents adapted to coöperate to produce the required in phase and out of phase relations. The armatures of both magnets are provided with separate windings for each indicating instrument. Thus, in the magneto 140, the separate coil 150 generates alternating voltages which are applied through the circuit of terminal 142, lead 143, terminal 47, field coils 26, 27, terminal 48, return 144, to coil 150. This magneto has its rotary inductor 4 secured to shaft 152 in a fixed phase relation by key 153. The armature of the other magneto 141 is supplied with a corresponding independent winding 160, which supplies alternating voltages or currents through lead 146, terminal 43, indicator coil 28, terminal 44, and return 147, to the other terminal of said coil 160. This magneto 141 is rotated by shaft 152, through key 153, which has a circumferential play of 90 degrees in slot 154. The circumferential extent of this slot is such that the currents generated in winding 160 are in phase with currents generated in winding 150 of magneto 140 when the generator shaft 152 is rotated so as to maintain key 153 in the position shown in Fig. 1, and out of phase when the direction of rotation is reversed. Thus, when the currents generated in windings 150, 160 are in phase, and in the same direction traverse the field and indicator coils a deflection of the index of indicator 10 will be caused in a direction indicated, as in Fig. 1, as toward the right. When the generator shaft reverses and the currents become of opposite phase by slip of the indicator of magneto 141, the current of magneto 140 through the field coils 26, 27 is as before, but the current from magneto 141 is reversed with respect thereto so that when the alternation causes flow of current from 140 out through 142, an equal current from 141 instead of flowing out through 146, flows out through 147 and back through 146, thus causing the index to move to the left. The second indicating instrument 10$^a$ is actuated by the alternating voltages or currents from windings 151, 161 of generators 140, 141 respectively. These windings are insulated from coils 150, 160. The circuit of coil 151 is through lead 149, terminal 47$^a$, field coils 26 and 27, terminal 48$^a$, and return 148, to the other terminal of coil 151. The circuit of coil 161 is through lead 162, terminal 45$^a$, indicator coil 28, terminal 44$^a$, and return 163, to the other terminal of coil 161.

The operation of the currents generated in the windings 151, 161 in phase and out of phase to actuate the indicating instrument 10$^a$, is as described above in connection with the currents generated in windings 150, 160. Where a considerable number of stations is desired, each of the wires of coils 150, 151 and 160, 161 may consist of groups of wires 164 (Fig. 2) which may be symmetrically arranged about the central wire 165, and, if desired, provided with additional insulation, as indicated at 160$^a$. The wire 165 may be utilized as a core of soft iron, or as one of the inductor windings.

The longitudinal arrangements of the wires within the cable may be either straight and parallel with the axis, or preferably twisted spirally about the axis. This cable may be wound after the same manner as an ordinary single wire armature, and each wire thereof utilized as a separate circuit, after the manner of 150, 160 and 151, 161 respectively. By such an arrangement the fluxes in each separate winding of the armature must be identical, and the short circuiting or open circuiting of any one of the windings will have much less effect on any one of the other windings, the error being divided among them.

While I have herein fully shown and described, and have pointed out in the appended claims certain novel features of construction, arrangement, and operation which characterize my invention, it will be understood by those skilled in the art that various omissions, substitutions and changes in the forms, proportions, sizes and details of the device and of its operation may be made without departing from the spirit of my invention.

I claim—

1. In a multiple station speed indicating system, a plurality of alternating current generators, each comprising an armature and a plurality of separate windings on the armature, a plurality of indicating instruments, circuit connections between one instrument and one winding of each armature, and circuit connections between a second instrument and a second winding of each armature.

2. In a multiple station speed indicating system, a single mechanical driving means for deriving power from the shaft whose speed is to be measured, in combination with a plurality of alternating current generators, all operated through said driving means, each comprising an armature and a plurality of separate windings on the armature, and a plurality of indicating instruments, circuit connections between one instrument and one winding of each armature, and circuit connections between a second instrument and a second winding of each armature.

3. In a multiple station speed indicating system, a plurality of alternating current generators, each comprising an armature and a plurality of separate, independently insulated windings on the armature, a plurality of indicating instruments, circuit connections between one instrument and one winding of each armature, and circuit connections between a second instrument and a second winding of each armature.

4. In a multiple station speed indicating system, a reversible shaft whose speed is to be indicated, a plurality of alternating current generators, each comprising an armature and a plurality of separate windings on the armature, a plurality of indicating instruments, circuit connections between one instrument and one winding of each armature, and circuit connections between a second instrument and a second winding of each armature, said generators being arranged to operate in phase upon the rotation of the shaft in one direction to produce equal indications of like direction of each of said indicating instruments.

5. In a multiple station speed indicating system, a reversible shaft whose speed is to be indicated, a plurality of alternating current generators, each comprising an armature and a plurality of separate windings on the armature, a plurality of indicating instruments, circuit connections between one instrument and one winding of each armature, and circuit connections between a second instrument and a second winding of each armature, said generators being connected to operate in phase upon the rotation of the shaft in one direction to produce equal indications of like direction of each of said indicating instruments, and to operate out of phase upon reversal of the shaft to produce equal indications of like reverse direction of each of said indicating instruments upon said reversal.

Signed at New York city, in the county of New York and State of New York, this 5th day of November, A. D. 1909.

MILLER REESE HUTCHISON.

Witnesses:
GEORGE C. DEAN,
IRVING M. OBRIEGHT.